US008997356B2

(12) United States Patent
Zhu et al.

(10) Patent No.: US 8,997,356 B2
(45) Date of Patent: Apr. 7, 2015

(54) METHOD OF IMPROVING TIRE SIDEWALL RESISTANCE TO DAMAGE

(75) Inventors: Fang Zhu, Greer, SC (US); Drew R. Howlett, Piedmont, SC (US); Craig Jurs, Greenville, SC (US)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 301 days.

(21) Appl. No.: 13/806,571

(22) PCT Filed: Jun. 23, 2010

(86) PCT No.: PCT/US2010/039568
§ 371 (c)(1),
(2), (4) Date: Dec. 21, 2012

(87) PCT Pub. No.: WO2011/162749
PCT Pub. Date: Dec. 29, 2011

(65) Prior Publication Data
US 2013/0086807 A1    Apr. 11, 2013

(51) Int. Cl.
*B21K 1/38* (2006.01)
*B60C 13/00* (2006.01)
*B60C 11/01* (2006.01)
*B60C 13/02* (2006.01)

(52) U.S. Cl.
CPC ............... *B60C 13/002* (2013.04); *B60C 11/01* (2013.01); *B60C 13/02* (2013.01)

(58) Field of Classification Search
CPC ...... B60C 11/01; B60C 13/02; B60C 13/002; B60C 19/12; B60C 2200/14
See application file for complete search history.

(56) References Cited

U.S. PATENT DOCUMENTS

| D187,575 S | 3/1960 | Cauarette | |
|---|---|---|---|
| 4,055,209 A | 10/1977 | Senger | |
| 4,265,287 A * | 5/1981 | Abe et al. | 152/209.16 |
| 4,982,773 A | 1/1991 | Bonko | |
| 5,205,880 A | 4/1993 | Iida et al. | |
| 6,000,451 A | 12/1999 | Takada | |
| 6,123,131 A * | 9/2000 | Takada | 152/454 |
| 6,189,586 B1 | 2/2001 | Guidry | |
| 6,920,906 B2 | 7/2005 | Allison et al. | |
| 8,434,534 B2 | 5/2013 | Barton | |
| 2003/0041939 A1 | 3/2003 | Allison et al. | |
| 2008/0149249 A1* | 6/2008 | Rahier et al. | 152/540 |
| 2008/0210355 A1 | 9/2008 | Harvey et al. | |
| 2011/0126950 A1* | 6/2011 | Barton | 152/209.11 |

FOREIGN PATENT DOCUMENTS

| EP | 0 477 017 A2 | 3/1992 |
|---|---|---|
| JP | 52-25301 | 2/1977 |
| JP | 55-39802 | 3/1980 |
| JP | 09-086107 | 3/1997 |
| WO | WO 2009/029088 | 5/2009 |

OTHER PUBLICATIONS

PCT International Search Report for PCT/US2010/039568, dated Aug. 19, 2010.

* cited by examiner

*Primary Examiner* — Alexander P Taousakis
(74) *Attorney, Agent, or Firm* — Dority & Manning, P.A.

(57) ABSTRACT

A method of improving the resistance of a tire sidewall to damage such as splitting or puncture is provided. More particularly, a method for determining the size and positioning of tread features along the sidewall of a tire so as to improve the protection of the sidewall against damage when contacting obstacles during operation of the tire is provided.

15 Claims, 6 Drawing Sheets

METHOD OF IMPROVING TIRE SIDEWALL RESISTANCE TO DAMAGE

FIELD OF THE INVENTION

The present invention relates to a method of improving the resistance of a tire sidewall to damage such as splitting or puncture. More particularly, the present invention provides a method for determining the size and positioning of tread features along the sidewall of a tire so as to improve the protection of the sidewall against damage when contacting obstacles during operation of the tire.

BACKGROUND OF THE INVENTION

Operating a tire in aggressive environments such as off road conditions provides challenges in protecting the tire from damage. Obstacles such as rocks, trees, and other features provide threats to the tire not only along the tread region but also along the sidewall. While the tread region is designed to be in contact with the ground surface and is therefore constructed from compositions intended for this purpose, the sidewalls are generally not designed to be ground contacting. Instead, the sidewalls of a tire typically include a relatively thin layer of rubber material that covers certain structural elements, such as e.g., the cords of a tire carcass, which extend between and through the sidewalls of the tire. This rubber material is conventionally created from a composition not designed for ground contact but rather for flexibility so that the sidewalls can withstand the repeated flexing of the tire that occurs as it rotates through the contact patch. In addition, this sidewall rubber is typically not as thick as the tread rubber. As such, the sidewalls generally have less resistance than the tread to splitting or other puncture damage that can occur when the tire is contacted with an obstacle along the ground surface.

Certain tires are intended for more rugged applications where encounters with obstacles that may split or otherwise damage the sidewall can be frequent. For example, for recreational and emergency off-road applications, tires may be subjected to repeated contact with obstacles that can split the sidewall and damage or even deflate a pneumatic tire. Of course, for such tires, it is generally desirable to increase their capability to resist sidewall damage such as splitting, puncture, rupture, or other sidewall damaging events caused by contact during tire use.

Features can be added along the sidewall to help resist certain sidewall damage. Lugs, blocks, and/or other tread features can be added about the sidewall to protect it from aggression by remaining between a dangerous obstacle and the sidewall as the tire interacts with the obstacle during operation. The addition of features along the sidewall adds material, complexity, and expense to a tire. Such features can also unfavorably reduce the flexibility of the sidewall. Therefore, it is desirable to optimize the size and positioning of such features particularly when not all portions of the sidewall necessarily need protection. Also, such features along the sidewall can significantly alter the appearance of the tire. Consequently, aesthetic concerns play a significant role in determining the shape and location of features added to the sidewall.

Accordingly, a method for improving the resistance of a tire sidewall to damage from obstacles during tire operation is needed. More particularly, a method that can be used to determine the size and positioning of protective features along the sidewall of a tire so as to improve resistance to splitting, puncture, and other potential damage would be useful. A method that can also be used while adjusting such features for aesthetic considerations would be also be useful.

SUMMARY OF THE INVENTION

Aspects and advantages of the invention will be set forth in part in the following description, or may be obvious from the description, or may be learned through practice of the invention.

In one exemplary aspect, the present invention provides a method of improving the protection of a tire sidewall against obstacles contacting the sidewall. The tire defines an equator and has at least one tread block and tread groove located along a shoulder of the tire. This exemplary method includes the steps of identifying a first area in which an obstacle would move along the sidewall if the obstacle slipped off the tread block as the tire rotates past the obstacle; identifying a second area in which the obstacle would move along the sidewall if the obstacle slipped off a tread groove as the tire rotates past the obstacle; identifying LPN, the radial position at which the obstacle would first contact the sidewall if the obstacle slipped off an edge of the tread block as the tire rotates; identifying LPG, the radial position at which the obstacle would first contact the sidewall if the obstacle slipped off an edge of the groove as the tire rotates; and determining one or more contact regions using the first and second areas, LPG, LPN and the equator.

The step of determining one or more contact regions includes defining the top and bottom of each contact region using at least two of the group that includes the equator, LPG, and LPN. Alternatively, the contact regions may further comprise a groove-based contact region defined by LPG, LPN, and the trace the obstacle would follow on the sidewall if the trace slipped off an edge of the tread groove; and a block-based contact region defined by LPN, the equator, and the trace the obstacle would follow on the sidewall if the trace slipped off an edge of the tread block.

This exemplary method can include positioning a groove-based tread feature upon the sidewall at the groove-based contact region and can include positioning a block-based tread feature upon the sidewall at the block-based contact region. The method can also include the step of staggering, along the sidewall of the tire, the groove-based tread feature and the block-based tread feature. The groove-based tread feature, block-based tread feature, or both may have a thickness in the range of about 3 mm to about 15 mm. The groove based feature is positioned closer to the summit of the tire than the block-based tread feature.

The radial depth of the groove-based tread feature can be increased beyond LPN, especially if the thickness of the groove-based tread feature is less than 3 mm. Similarly, the radial depth of the block-based tread feature can be increased beyond the equator, especially if the thickness of the block-based tread feature is less than 3 mm. Preferably, the distance along the radial direction between the top and the bottom of the groove-based feature, the block-based feature, or both, is at least 10 mm.

This exemplary method can further include the steps of selecting tread features for location along the sidewall of the tire; and positioning the tread features based upon the location of the groove-based contact region and the block-based contact region.

The first and second areas can be based on traces that are determined using the following equations:

$$r = \sqrt{(L_o - R\theta)^2 + H_o^2}$$

$$\alpha = \theta + \arctan\frac{H_o}{L_o - R\theta}$$

where:
R=radius of the tire
θ=the amount of the tire's rotation
$L_o$=the initial horizontal position of the obstacle $P_0$ relative to the tire center O
$H_o$=the initial vertical position of the obstacle $P_0$ relative to the tire center O
r=the radial coordinate of the obstacle
α=the angular coordinate of the obstacle Alternatively, the traces can be determined experimentally. Similarly, LPN and LPG can be determined by mathematical modelling or determined experimentally.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

For purposes of describing the invention, reference now will be made in detail to embodiments and aspects of the invention, one or more examples of which are illustrated in the drawings. Each example is provided by way of explanation of the invention, not limitation of the invention. In fact, from the teachings disclosed herein, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

As used herein, the following terms are defined as follows:

Radial refers to directions perpendicular to the axis of rotation of the tire.

LPN refers to the radial position at which an obstacle would first contact the sidewall of the tire if the obstacle slipped off an edge of a tread block as the tire rotates along its path after making contact with the obstacle.

LPG refers to the radial position at which the obstacle would first contact the sidewall of the tire if the obstacle slipped off an edge of a tread groove as the tire rotates along its path after making contact with the obstacle.

Equator refers to the radial location along the sidewall at which the tire is widest as viewed in a cross section taken along a plane perpendicular to the circumferential direction of the tire.

Trace refers to the path a point of contact of an obstacle would make along the sidewall of a tire as the tire rotated past, and in a non-deforming contact with, the obstacle.

Figure 1:
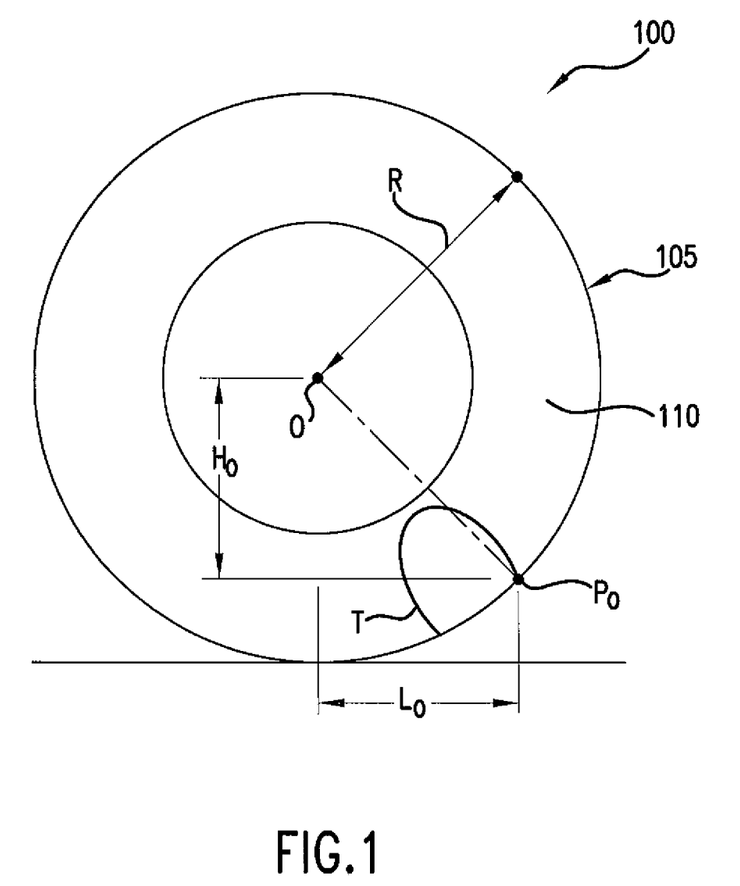
FIG. 1 illustrates an exemplary trace along the sidewall of a tire that is represented schematically.

As a tire rolls along a surface during operation, the sidewall may come into contact with an obstacle capable of damaging the sidewall by splitting or puncturing. For purposes of describing the invention, assume that such an obstacle can be represented by a single point of contact that begins along the tread region of the tire and then moves along the tire sidewall as the tire rotates. As the tire rolls past such an obstacle, the point of contact with the obstacle will follow a path—referred to herein as a trace—along the sidewall of the tire. By way of example, assuming that the sidewall is flat and undamaged by contact with the obstacle, this trace can be characterized mathematically by the following equations:

$$r = \sqrt{(L_o - R\theta)^2 + H_o^2} \qquad (1) \,\&\, (2)$$

$$\alpha = \theta + \arctan\frac{H_o}{L_o - R\theta}$$

where:
R=radius of the tire
θ=the amount of the tire's rotation
$L_o$=the initial horizontal position of the obstacle $P_0$ relative to the tire center O
$H_o$=the initial vertical position of the obstacle $P_0$ relative to the tire center O
r=the radial coordinate of the obstacle
α=the angular coordinate of the obstacle Accordingly, as illustrated in FIG. 1A, assuming an obstacle initially contacts tire 100 at point $P_0$ along the tread region 105, trace T illustrates the path that the obstacle will make along the sidewall 110 of the tire 100 as calculated using equations 1 and 1 Equations 1 and 2 are provided by way of example. Other mathematical models may be used for determining the trace or such can be determined experimentally as well.

One mode of sidewall splitting that can occur is when a tire initially rolls into contact with an obstacle and the tire subsequently slips off the obstacle. For example, as tire 100 encounters an obstacle in its path, initial contact may occur between tread region 105 and the obstacle. However, as tire 100 rotates, the tread region 105 may slip off the obstacle leading to undesired contact with the sidewall 110. Accordingly, an important step in improving the resistance of sidewall 110 to damage is to determine where the obstacle will make contact with sidewall 110 when such a slip occurs. The location will likely be different depending upon whether the obstacle slips off the edge of a tread block or the edge of a tread groove.

Figure 2A:
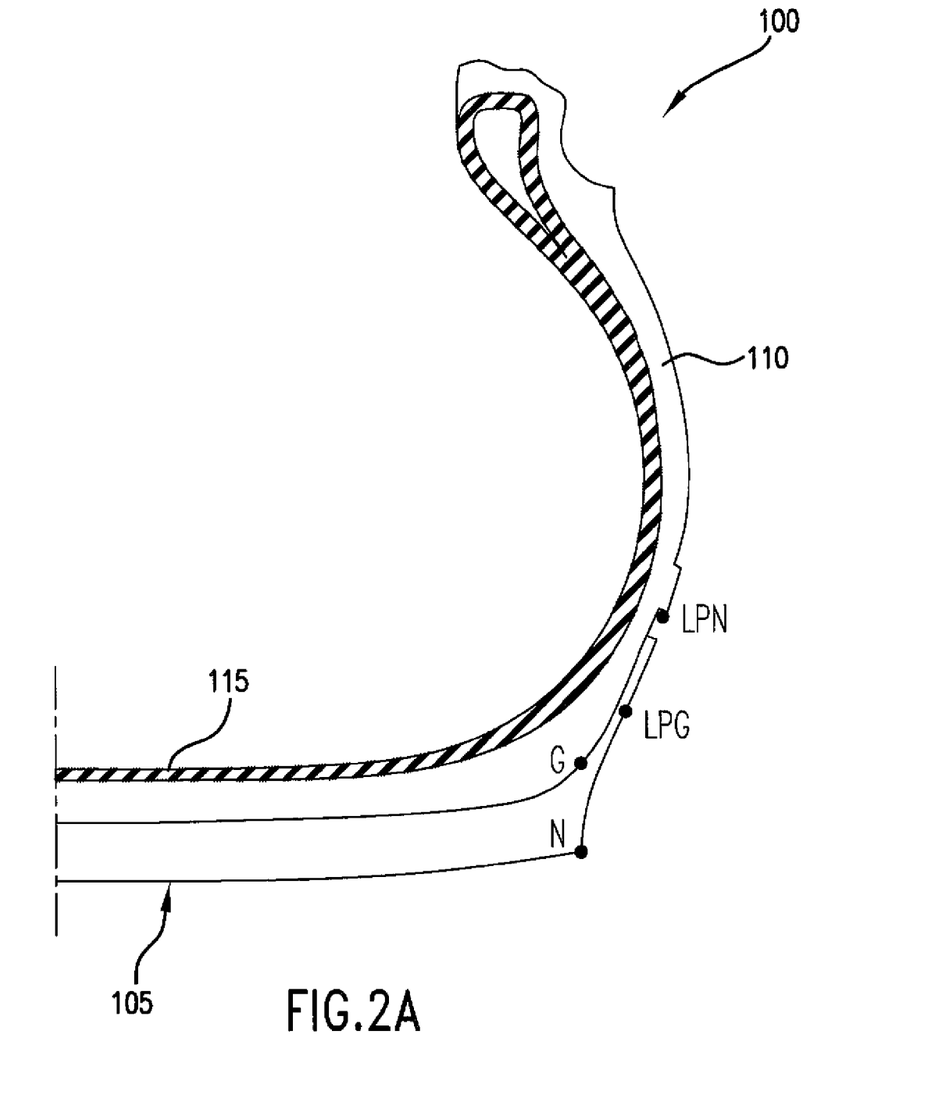
FIGS. 2A through 2C illustrate a sectional views of a tire schematic for purposes described in the specification below.

Referring now to FIG. 2A, point N represents the edge of a tread block 160 (FIG. 3A) and point G represents the edge of a tread groove 170 (FIG. 3A) within tread region 105. If the obstacle slips off point N (i.e. an edge of a tread block 160), then LPN represents the radial position along sidewall 110 at which the obstacle will land or first make contact with sidewall 110. If the obstacles slips off point G (i.e. an edge of a tread groove 170), then LPG represents the radial position along sidewall 110 at which the obstacle will first make contact with sidewall 110.

Figure 2B:
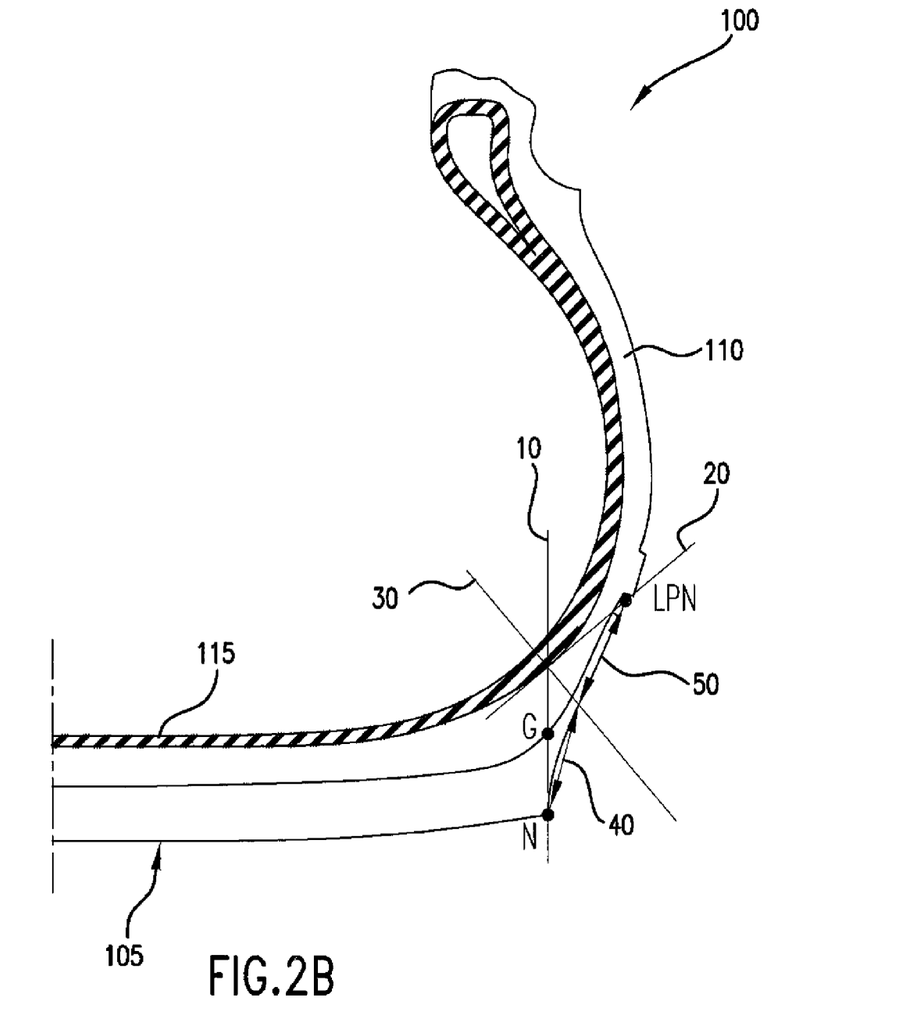
Figure 2C:
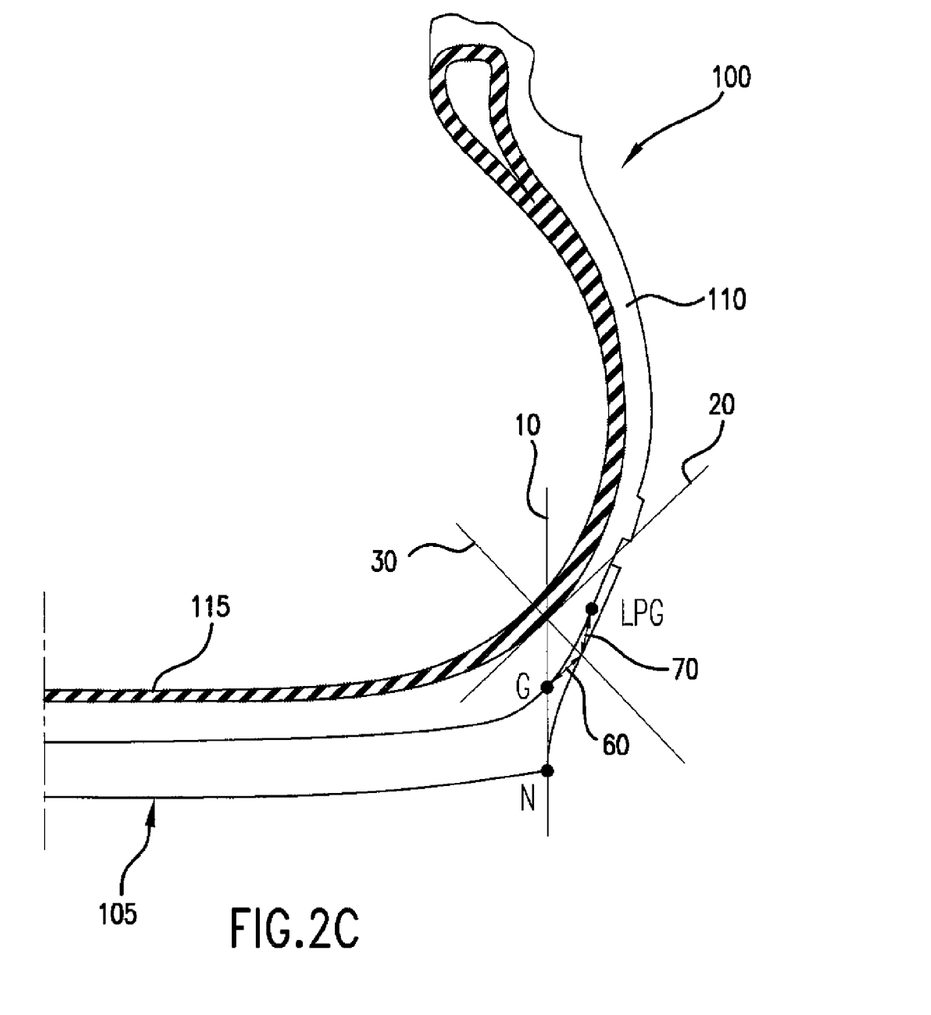

The radial position of LPG or LPN can be determined mathematically or by experiment. For example, FIGS. 2B and 2C provide an exemplary illustration of a numerical method for determining LPN and LPG, respectively. First, beginning with FIG. 2B, a straight line 10 is drawn that passes through point N and point G. Next, a straight line 20 is constructed tangent to the tire carcass 115 at the location where line 10 passes through carcass 115. Straight line 30 is then drawn perpendicular to line 20 and through the point where lines 10 and 20 intersect. Length 40 represents the distance along sidewall 110 from point N to line 30. Length 50 is equal to length 40 and represents the distance of LPN from line 30 along sidewall 110. Similarly, the position of LPG can be determined as shown in FIG. 2C. Length 60 represents the distance along sidewall 110 from point G to line 30. Length 70 is equal to length 60 and represents the distance of LPG from line 30 along the sidewall 110.

The final positions of LPG and LPN as calculated using the above technique may need to be adjusted based on the particular construction of the tire and/or the off-road conditions anticipated during its use. It has been determined that the final positions of LPN and LPG may be located at about −15 mm to +5 mm along sidewall 110 from the positions calculated using the technique shown in FIGS. 2B and 2C. As previously stated, the positions of LPG and LPN can be determined by other methods as well. For example, experiments can be conducted to determine the actual location along sidewall 110 at which an obstacle makes contact after slipping off tread groove 170 or tread block 160.

Figure 3A:
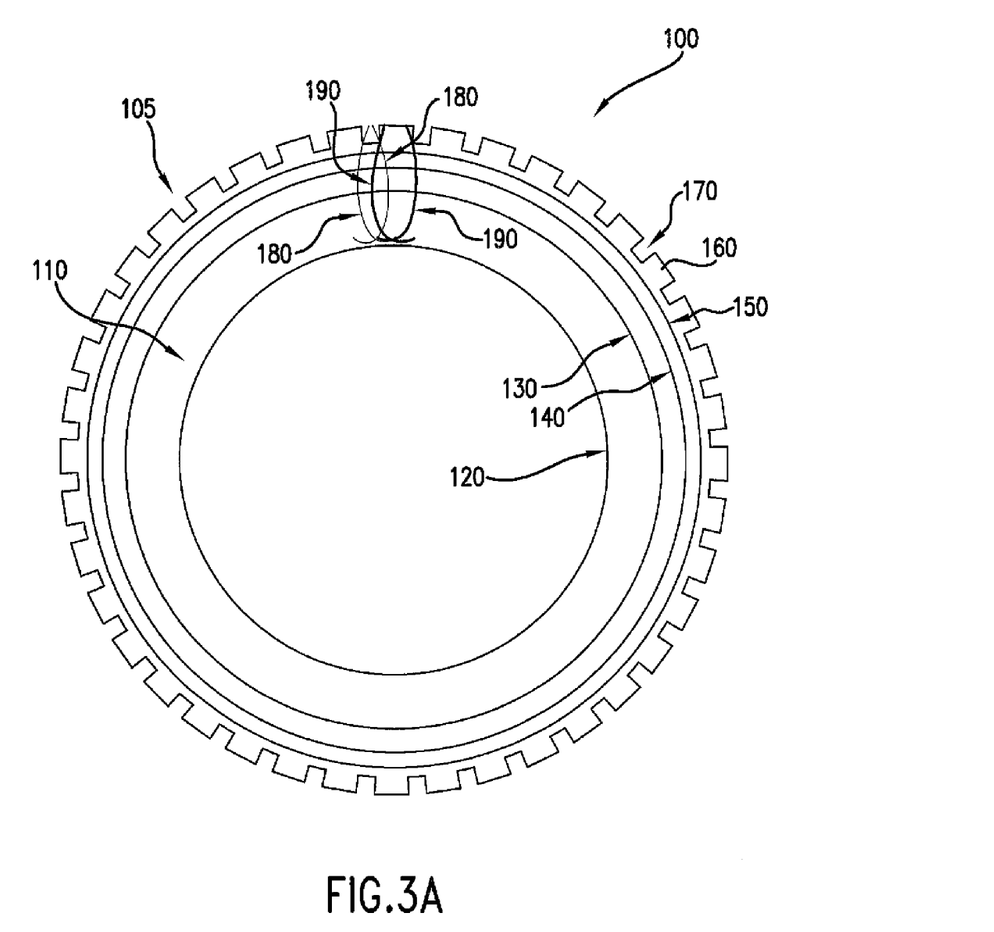
FIG. 3A is a side view of an exemplary tire showing traces along the sidewall of the tire as well as a circles positioned at the equator, LPN, LPG, and the rim seating location as described below.

FIG. 3A is a side view of tire 100 with sidewall 110 and tread region 105 shown in more detail. Using the calculation of LPN and LPG, circles 140 and 150 have been superimposed onto sidewall 110. Circle 140 represents the circumferential position of LPN about the sidewall 110 of tire 100 while circle 150 represents the circumferential position of LPG about the sidewall 110. LPG's circle 150 will always be located closer to the tread region 105 than LPN's circle 140. Circle 130 represents the position of the equator of tire 110. Circle 120 represents the location on tire 100 where a rim would be received. Tread region 105 of tire 100 also includes tread blocks 160 and tread grooves 170 along the tire shoulder as shown. Blocks and grooves having shapes and sizes other than as shown in FIG. 3A may also be used with the present invention as well.

Figure 3B:
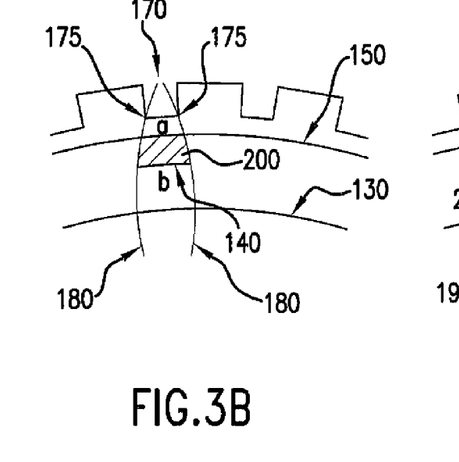
FIGS. 3B and 3C are close-up views of a portion of the sidewall of the exemplary tire shown in FIG. 3A.
Figure 3C:
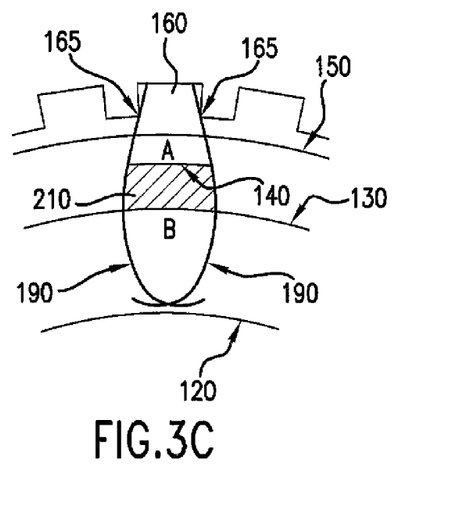

Using equations 1 and 2 above, the traces for an obstacle slipping off the edges of a tread block 160 and a tread groove 170 have been calculated and superimposed onto sidewall 110. More specifically, as shown in FIGS. 3A thru 3C, trace 180 brackets a tread groove 170 between ends 175 and defines an area within which an obstacle would move if the obstacle started anywhere in the groove 170 as tire 100 rotates (either forward or backward) into contact with, and then past, the obstacle. Similarly, trace 190 brackets a tread block 160 with ends 165 and defines an area within which an obstacle would move if the obstacle started anywhere on the tread block 160 as the tire 100 rotates (either forward or backward) into contact with, and then past, the obstacle. More specifically, referring now to FIG. 3B, if an obstacle slips off of tread groove 170 during operation, the obstacle will move between the curves of groove-based trace 180. Similarly, referring to FIG. 3C, if an obstacle slips off of tread block 160 during operation, the obstacle will move between the curves of block-based trace 190.

Accordingly, traces 180 and 190 along with circles 120, 130, and 140 assist in identifying one or more contact regions of concern for splitting or puncture of sidewall 110 during operation of tire 100. Consequently, these contact regions represent preferred locations for the consideration of adding protection such as the addition of tread features to sidewall 110. Aesthetic considerations can also be applied using the identification of these contact regions.

For example, referring to FIG. 3B, groove-based contact region 200 (represented by cross-hatching) denotes a preferred position for adding a tread feature to protect sidewall 110 against an obstacle that slips off of a groove 170. Contact region 200 is bounded by trace 180, LPN circle 140, and LPG circle 150. The thickness of the tread feature (i.e. the height of the tread feature above the surrounding sidewall 110) to be added at contact region 200 is determined by how much improvement in performance is desired. Normally, such a tread feature should be in the range of about 3 mm to about 15 mm in thickness. Thicker features will provide more protection but at increased cost in materials and the addition of weight to the tire. It may also generate excessive heat that may damage the tire during prolonged operations. Thinner features, i.e., less than 3 mm can also be used but it may be desirable to extend the bottom of the tread feature (line b) beyond LPN circle 140 to provide additional protection. Regardless, preferably the distance between top of the tread feature (line a) and the bottom of the tread feature (line b) should be at least about 10 mm along the radial direction and need not be precisely located at circles 140 and 150, respectively.

Similarly, block-based contact region 210 (represented by cross-hatching) in FIG. 3C indicates a preferred position for adding a tread feature to protect against an obstacle that slips off of a tread block 160. Region 210 is bounded by trace 190, equator circle 130, and LPN circle 140. Again, the thickness of the tread feature is preferably in the range of about 3 mm to about 15 mm depending upon the amount of protection desired. Features less than 3 mm in thickness may require moving the bottom of the feature (line B) beyond the equator circle 130 so as to provide additional protection. Preferably the distance between the top of the tread feature (line A) and the bottom of the tread feature (line B) should be at least about 10 mm along the radial direction.

Depending upon the relative widths of tread blocks and grooves for a particular tire construction, the addition of tread features as described above may result in overlap. For example, if tread features are positioned coextensive with the contact region 210 for each of the tread blocks 160 on tire 100, a continuous rib or ring will be formed on sidewall 110. While such a feature may offer much protection to the sidewall 105, a solid ring may not be satisfactory from an aesthetic perspective or from the standpoint of mud traction. It may also generate excessive heat that may damage the tire during prolonged operations. Accordingly, using information provided by identifying the contact regions as described above, tread features may be staggered or otherwise shaped and manipulated along the sidewall in order to optimize sidewall protection while also addressing other concerns such as aesthetic, mud traction, and heat. In addition, tread features may be positioned coextensive or somewhat offset from the contact regions while still providing sidewall protection based on knowing the location of the anticipated contact regions.

Figure 4:
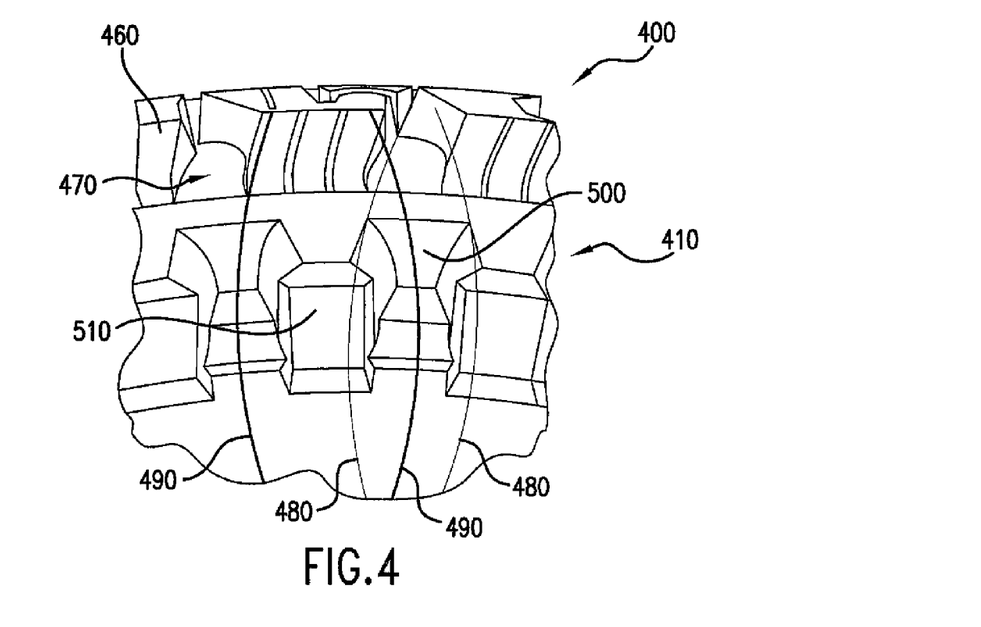
FIG. 4 illustrates a portion of a representative sidewall for purposes of further describing an exemplary procedure for positioning tread features along the sidewall.

FIG. 4 represents a portion of a tire 400 having tread blocks 460 and tread grooves 470. Also shown is trace 480 based on the edges of groove 470 and trace 490 based on the edges of block 460. Using the methods described above, groove-based tread features 500 have been positioned radially below grooves 470 to protect sidewall 410 from obstacles slipping off the grooves. Similarly, block-based tread features 510 have been positioned radially below blocks 460 to protect sidewall 410 from obstacles slipping off the blocks. In order to improve aesthetic appeal, features 500 and 510 have been shaped and staggered as shown in FIG. 4. Other shapes and orientations may be applied. However, the positioning of such features is informed using the methods described herein.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of improving the protection of a tire sidewall against obstacles contacting the sidewall, the tire having an equator, the tire also having at least one tread block and tread groove located along a shoulder of the tire, the method comprising the steps of:
   identifying a first area in which an obstacle would move along the sidewall if the obstacle slipped off the tread block as the tire rotates past the obstacle;
   identifying a second area in which the obstacle would move along the sidewall if the obstacle slipped off a tread groove as the tire rotates past the obstacle;
   identifying LPN, the radial position at which the obstacle would first contact the sidewall if the obstacle slipped off an edge of the tread block as the tire rotates;
   identifying LPG, the radial position at which the obstacle would first contact the sidewall if the obstacle slipped off an edge of the groove as the tire rotates; and
   determining one or more contact regions using the first and second areas, LPG, LPN and the equator providing said tire with tread features upon the sidewall, wherein the tread features are positioned at the contact regions.

2. A method of improving the protection of a tire sidewall as in claim 1, wherein said step of determining one or more contact regions includes defining the top and bottom of each said contact region using at least two of the group that includes the equator, LPG, and LPN.

3. A method of improving the protection of a tire sidewall as in claim 1, wherein said one or more contact regions further comprises:
   a groove-based contact region defined by LPG, LPN, and the trace the obstacle would follow on the sidewall if the trace slipped off an edge of the tread groove; and
   a block-based contact region defined by LPN, the equator, and the trace the obstacle would follow on the sidewall if the trace slipped off an edge of the tread block.

4. A method of improving the protection of a tire sidewall as in claim 3, further comprising the steps of:
   positioning a groove-based tread feature upon the sidewall at said groove-based contact region.

5. A method of improving the protection of a tire sidewall as in claim 4, further comprising the steps of:
   positioning a block-based tread feature upon the sidewall at said block-based contact region.

6. A method of improving the protection of a tire sidewall as in claim 5, further comprising the step of staggering, along the sidewall of the tire, said groove-based tread feature and said block-based tread feature.

7. A method of improving the protection of a tire sidewall as in claim 5, wherein said groove-based tread feature and said block-based tread feature each have a thickness in the range of about 3 mm to about 15 mm.

8. A method of improving the protection of a tire sidewall as in claim 5, wherein said groove-based tread feature is positioned closer to the summit of the tire than said block-based tread feature.

9. A method of improving the protection of a tire sidewall as in claim 8, wherein said tread features have a thickness of less than 3 mm, and further comprising the steps of
   increasing the radial depth of the groove-based tread feature beyond LPN if the thickness of said groove-based tread feature is less than 3 mm; and
   increasing the radial depth of the block-based tread feature beyond the equator if the thickness of said block-based tread feature is less than 3 mm.

10. A method of improving the protection of a tire sidewall as in claim 8, wherein the distance along the radial direction between the top and the bottom of said groove-based feature is at least 10 mm.

11. A method of improving the protection of a tire sidewall as in claim 8, wherein the distance along the radial direction between the top and the bottom of said block-based feature is at least 10 mm.

12. A method of improving the protection of a tire sidewall as in claim 3, further comprising the steps of
   selecting tread features for location along the sidewall of the tire; and
   positioning said tread features based upon the location of said groove-based contact region and said block-based contact region.

13. A method of improving the protection of a tire sidewall as in claim 1, wherein said first and second areas are based on traces that are determined using the following equations:

$$r = \sqrt{(L_o - R\theta)^2 + H_o^2}$$

$$\alpha = \theta + \arctan\frac{H_o}{L_o - R\theta}$$

where:
   R=radius of the tire
   θ=the amount of the tire's rotation
   $L_o$=the initial horizontal position of the obstacle $P_0$ relative to the tire center O
   $H_o$=the initial vertical position of the obstacle $P_0$ relative to the tire center O
   r=the radial coordinate of the obstacle
   α=the angular coordinate of the obstacle.

14. A method of improving the protection of a tire sidewall as in claim 1, wherein said LPN and said LPG are determined experimentally.

15. A method of improving the protection of a tire sidewall as in claim 1, wherein said LPN and said LPG are determined by mathematical modeling.

\* \* \* \* \*